United States Patent [19]

Javitt

[11] Patent Number: 5,926,483
[45] Date of Patent: Jul. 20, 1999

[54] METHOD FOR DYNAMIC ALLOCATION OF VOICE AND IMAGE COMPRESSION

[75] Inventor: Joel I. Javitt, Hillside, N.J.

[73] Assignee: AT&T Corp, Middletown, N.J.

[21] Appl. No.: 08/744,297

[22] Filed: Nov. 6, 1996

[51] Int. Cl.[6] ................................................ H04J 3/14
[52] U.S. Cl. ................................................ 370/477
[58] Field of Search ................................. 370/229, 230, 370/231, 232, 233, 234, 235, 236, 237, 238, 239, 240, 242, 244, 250, 251, 252, 253, 400, 410, 412, 413, 414, 468, 521, 477; 375/240, 241

[56] References Cited

U.S. PATENT DOCUMENTS

| | | |
|---|---|---|
| 4,679,187 | 7/1987 | Irvin . |
| 5,130,982 | 7/1992 | Ash et al. ................................. 370/352 |
| 5,559,798 | 9/1996 | Clarkson et al. ........................ 370/232 |
| 5,579,301 | 11/1996 | Ganson et al. ......................... 370/229 |

*Primary Examiner*—Huy D. Vu

[57] ABSTRACT

A communications system providing a means for dynamically controlling system performance during times when communications traffic substantially changes to prevent blocking service while maintaining communications quality. The communications system provides such dynamic control for voice and/or video communications. For example, a voice communications system according to the present invention provides a means for increasing the effective voice capacity during times of increased voice traffic in a given service area, and decreasing the effective voice capacity during time of decreased voice traffic, wherein the decrease in the effective voice capacity provides an increase in voice quality. In one illustrative embodiment, when the voice traffic increases to a given threshold level, the system implements speech compression on selected channels to increase the effective capacity to that service area. In another embodiment, the system combines two compressed channel into one to increase the effective capacity even further.

33 Claims, 2 Drawing Sheets

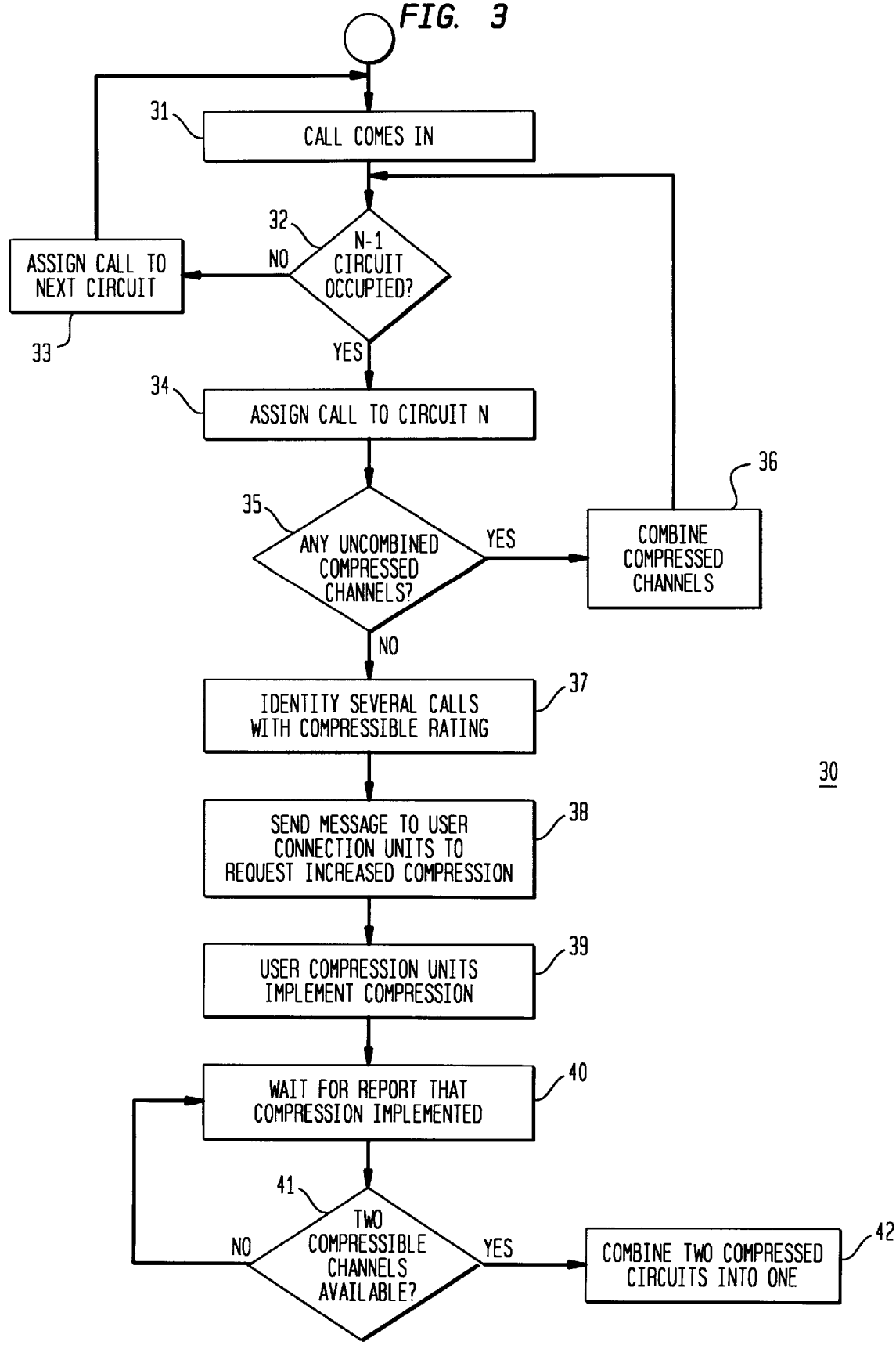

METHOD FOR DYNAMIC ALLOCATION OF VOICE AND IMAGE COMPRESSION

FIELD OF THE INVENTION

This invention relates to communications systems, and more particularly to systems providing compressed voice and/or compressed image communications.

BACKGROUND OF THE INVENTION

Presently, wireless and wireline voice and/or video communication systems use analog coding, digital coding, or a rigid, separable combination of each to provide voice and/or video service to a user. In such systems, depending on the voice and/or video traffic and communication resources in a given service area, voice and video compression schemes are implemented to increase system capacity. As a result, in providing voice and/or video service for a given service area through present day systems, there is a tradeoff between quality and capacity, wherein :he tradeoff depends on the compression rate employed for that service area.

For example, in present day systems employing a high compression rate for voice and/or video communications, service can be provided to a greater number of users or callers, but usually at the cost of providing lower voice and/or video quality. As a result, once a present day voice and/or video communications system is designed with a given compression scheme, the system quality and capacity can thereby become inflexible to random and periodic fluctuations in service demand as well as a change in user needs and system services. Therefore, such present day systems are less desirable for providing such voice and/or video communications.

SUMMARY OF THE INVENTION

Accordingly, the present invention provides a communications system and method for preventing the blockage of service to system users while maintaining the quality of voice and/or video communications thereon. To attain this, the effective system capacity is dynamically controlled such that the effective system capacity is increased during times of peak traffic and decreased during times of reduced voice traffic, wherein a decrease in the effective capacity provides an increase in communications (i.e. voice and/or video) quality.

In one illustrative embodiment, the present invention provides a communications system that monitors voice and video traffic in a given service area and dynamically adjusts the communications over selected channels to control the effective system capacity for that service area.

In another illustrative embodiment, the present invention provides a voice communications system having a given number of voice channels in a given service area, wherein a network controller periodically monitors the availability of the voice channels to determine a probability that a future call will be blocked on the system. The determined blocking probability is then compared to an acceptable blocking probability to determined whether the system capacity needs adjustment to prevent the blocking. If the determined blocking probability is greater than the acceptable blocking probability, the network controller selects a given number of channels for implementing or changing a compression scheme thereon.

Alternatively, in another illustrative embodiment, a given heuristic or approximation means can be used to determination whether blocking is likely to occur. In such an embodiment, when the blocking probability is significant enough, selected channels can be compressed to increase the effective voice capacity in that given area. In such an embodiment, the effective voice capacity can be further increased by increasing the voice compression on selected channels.

In another illustrative embodiment, compressed voice and/or video channels can be combined into one channel. For example, two selected compressed channels can be combined into one channel, thereby leaving a free channel for a future voice call on the system and thus their increasing system capacity.

In yet another illustrative embodiment, a voice communications system eliminates speech compression on selected channels and de-combines previously combined channels when the probability of blocking falls below some critical level. To reduce any performance degradation due to the elimination of speech compression on selected channels, the system only eliminates speech compression when the voice traffic is relatively light (i.e. times when a low number of channels are needed to prevent blocking). Such a system provides an improved performance over the prior art because the decompression or de-combining of the channels acts to increase or restore system voice quality in the given service area. As a result, the present invention provides a voice communications system and method for dynamically controlling system capacity and voice quality to prevent call blocking during times of peak system needs. Thus, the present invention overcomes, to a large extent, the limitations of the prior art.

These and other features of the invention are described in more detail in the following detailed description of the embodiments of the invention when taken with the drawings. The scope of the invention, however, is limited only by the claims appended hereto.

BRIEF DESCRIPTION OF THE DRAWINGS

FIG. 3 is flow-diagram of one method of providing the dynamic performance control in a communications system according to the present invention.

DETAILED DESCRIPTION OF ILLUSTRATIVE EMBODIMENTS OF THE INVENTION

Figure 1:
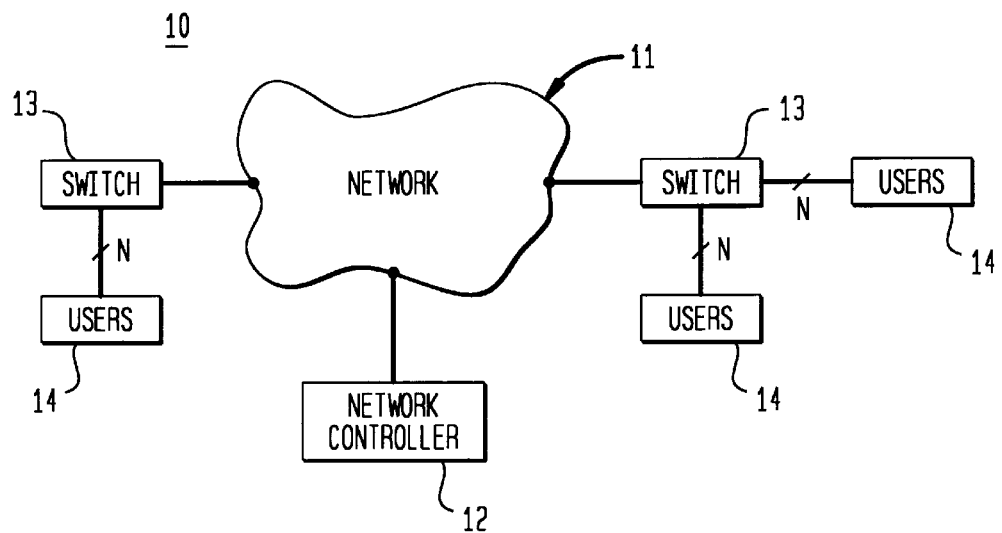
FIG. 1 is an illustrative embodiment of a communication system having the dynamic performance control according to the present invention.

Referring now to FIG. 1, there is shown a block diagram of one illustrative embodiment of a communications system 10 providing the dynamic performance control according to the present invention. As shown, system 10 has a plurality of users 14 electrically coupled to a communications network 11 through switches, 13. Communications system 10 provides a given number N channels to a given service area.

In operation, network controller 12 monitors the voice and/or video traffic on the given number of N channels in the given service area to determine whether the traffic at a given time is approaching the system capacity in that given area. That is, network controller 12 determines how many of the N channels are being used at a given time, and thus how many channels are left for possible additional callers on the system. From this information, the network controller determines if it is likely that a potential user will be blocked from or denied voice and/or video service on network 11 due to the lack of available channels N.

If the probability of a blocking reaches some predetermined unacceptable level, then network controller 12 initiates the a means for increasing the system capacity so that more voice and or video traffic can be handled by system 10 per unit time. This increase in system capacity can be accomplished through any one of many means selected or designed for system 10.

One method of increasing the voice capacity is to compress the speech on any number of channels selected on the system 10. That is, in the given service area, the speech of selected channels can be compressed to increase the effective capacity (# calls handled/unit time) of system 10 so that the probability of blocking is reduced to an acceptable level of probability. In addition, the effective capacity can be further increased by increasing the compression on any of the selected channels.

Similarly, if network controller 12 determines that the number of available channels is greater than a given number or that the probability of blocking is below a given minimum blocking probability, then the compression of the speech on the selected channels can be reduced or eliminated (i.e. decompressed), thus increasing speech quality during time of low voice traffic rate. Thus, system 10 provides the dynamic control over the effective capacity and speech quality to substantially improve the performance of system 10 during times of changing voice traffic.

Figure 2:
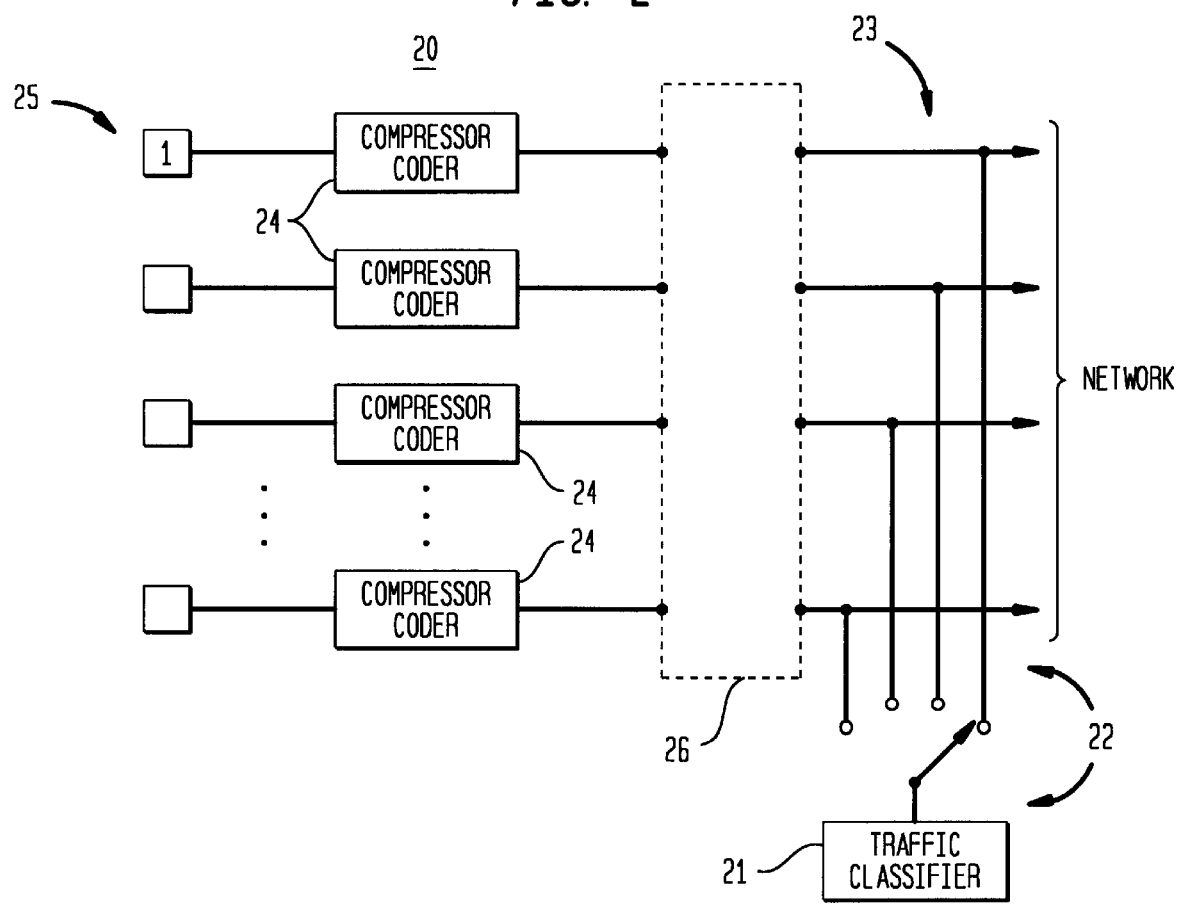
FIG. 2 shows another illustrative embodiment of a communication system providing the dynamic performance control according to the present invention.

Referring now to FIG. 2, there is shown a block diagram illustrating another embodiment of a communications system 20 according to the present invention. As shown, communications system 20 has a traffic classifier 21 coupled to a circuit group 23 through a circuit selector 22. The circuit group 23 is coupled to users 25 through a shared media (e.g. an RF channel in free space or a coaxial cable) or switch 26 and compression coders 27.

In operation, the traffic classifier 21 continually cycles between all of the traffic lines of circuit group 23 through circuit selector 22 to determine if the traffic being carried is voice or data. For data traffic, traffic classifier 21 determines the communications standard being used, including the bit rate. For voice traffic, traffic classifier 21 evaluates the ability of various compression algorithms to compress voice traffic without excessive distortion. That is, traffic classifier 21 determines for each possible compression ratio the distortion would be caused by that compression, and assigns a compressibility rating to each channel to indicate the compressibility or desirability of compressing that channel. From this information, a network controller (not shown) can determine or select which channels to compress when the probability of blocking reaches some critical level, thus improving the performance of communications on system 20 over that provided by the embodiment shown for system 10 in FIG. 1.

In another illustrative embodiment, the system may maintain a data base of customer preferences (e.g. those customers that do not want speech compression). During system operation, such a data base may be checked to determine the specific preferences of each customer participating in a call. As a result, in such a system, a determination of which channel to compress could be made after consulting both the compressibility rating of the service area and the customer preferences.

A method 30 for further improving the voice performance (of system 20, shown in FIG. 20, is shown in FIG 3. As shown, when a new call comes in from a given service area, at step 31, the channel availability for that area is determined at step 32. If there is more than one channel available, the incoming call is assigned to the next channel at step 33. If, however, there is only one channel available, then the last channel is assigned to the incoming call, at step 34, and the channels are checked to determined which channels have compressed voice traffic and which channels can be combined with other channels, at step 35.

If there are compressed channels that are not combined, then two of these compressed channels are combined at step 36, and the channel availability is thereafter rechecked at step 32, and proceeds therefrom as described above. If, however, there are no non-combined compressed channels, then a predetermined number of calls having a high compressibility as described above, are identified at step 37. Once identified, an increase in the compression of speech on these channels is requested at step 38. When the request units increase compression at step 39, method 30 waits for a report from each unit that the compression was implemented at step 40. Finally, the availability of two compressed channels is checked at step 41. If two uncombined, compressed channels are available then they are combined into one channel, thereby further increasing the effective system capacity.

Although several means for monitoring voice traffic will be apparent to those skilled in the art, a typical example for most communications systems is for the network controller to periodically monitor voice traffic measurements stored for that given service area. This is a common operation for some communications systems. When the voice traffic measurements, both in terms of the number of channels occupied and/or the arrival rate of new traffic, reach a critical threshold (e.g. an unacceptable likelihood of blocking, and a minimum acceptable number of available channels, etc.) the network controller initiates a decrease in the digital voice compression rate to a predetermined number of users. This will effectively increase the number of available voice channels within the service area, thus providing service to more new users.

Several means for implementing a change in the compression rate (i.e. increase compression when there is a high probability of blocking video and/or voice service to a user, and decrease compression when there is a low probability of blocking video and/or voice service) can be used. A typical example for implementing such a scheme for voice communications would be to switch from an 8 Kb/s voice compression rate (commonly used in current TDMA wireless systems) to a 4 Kb/s voice compression rate. Such a switch would provide a decrease in the number of time slots/user that are necessary for voice communication. Thus, providing a larger number of logical channels for new calls, but a decrease in voice quality. Similarly, under low traffic conditions (e.g. when voice traffic is below a predetermined threshold) the network controller can initiate a switch from the higher compression rate to the lower compression rate to maximize voice quality, with the corresponding decrease in capacity to handle calls from new users. Thus, the present invention can provide the dynamic control over voice system performance during times of changing voice traffic conditions through the selective implementation of various voice compression schemes.

The dynamic control over the system performance can also be performed in a hybrid analog/digital communication system. Within such a system users communicate using both digital voice compression and analog voice compression techniques. Similar to the embodiments described above, the present inventive dynamic control over system performance can be provided through a network controller that continually monitors voice traffic measurements and initiates a change in voice compression during times of changing traffic conditions. That is, a predetermined number of users currently using analog compression techniques are switched to digital compression techniques so that the system may accommodate more users by increasing the number of available logical voice channels with the corresponding reduction in voice quality. When voice traffic decreases below a given threshold, the network controller can switch a predetermined number of digital compression users to analog voice compression techniques to improve voice quality, while decreasing system capacity to handle new callers.

Within a wireless communication system, one typical example of implementing this embodiment may be to switch the radio port channel from FDMK access technology to DMA access technology during the call. Such an embodiment is a continual dynamic system which adjusts from analog voice compression to digital voice compression and vice-versa in response to changing voice traffic conditions while substantially maintaining high voice quality to the user.

The above description includes exemplary embodiments and methods of implementing the present invention. References to specific examples and embodiments in the description should not be construed to limit the present invention in any manner, and is merely provided for the purpose of describing the general principles of the present invention. It will be apparent to one of ordinary skill in the art that the present invention may be practiced through other embodiments.

What is claimed is:

1. A method for dynamically controlling the performance of a communications system that provides a given number of channels in a given service area to given users, the method comprising the steps of:
   a. determining a number of available channels in the given service area at a given time, including determining the possible distortion of voice caused by application of compression techniques on each of the available channels;
   b. determining a probability that service will be blocked on the communications system to a given user at said given time; and
   c. compressing communications on at least one predetermined channel in a given service area when said probability that said service will be blocked is greater than a predetermined maximum acceptable blocking probability and if that predetermined channel has an acceptable possible distortion level and leaving channels with high distortion uncompressed.

2. The method of claim 1 wherein said steps a–c are repeated until the communications on all the channels of said communications system in said given area are compressed.

3. The method of claim 1 further comprising the steps of monitoring said number of available channels to determine a new number of available channels, determining a new probability that service will be blocked on said new number of available channels, and increasing said compression on said at least one predetermined channel if said new probability that service will be blocked is greater than said maximum acceptable blocking probability.

4. The method of claim 1 further comprising the steps:
   i.) requesting a compassion unit to compress the communications on a given channel;
   ii.) repeating step a. for a given number of channels;
   iii.) identifying each channel on which said communications were compressed in steps i.) and ii.); and
   iv.) combining two channels identified in step iii.) into one channel to increase the communications capacity of the system.

5. The method of claim 1 wherein said step of determining the number of available channels is performed through a network controller.

6. The method of claim 1 wherein said communications system is a wireless voice communications system.

7. The method of claim 6 wherein said wireless system is a system selected from the group comprising time division multiple access (TDMA) systems, frequency division multiple access (FDMA) systems, and code division multiple access (CDMA) systems.

8. The method of claim 1 wherein said communications system is a digital voice communications system.

9. The method of claim 8 wherein said digital voice communications system utilizes a point-to-point microwave link.

10. The method of claim 8 wherein said digital voice communications system utilizes a satellite link.

11. The method of claim 8 wherein said digital voice communications system utilizes a fiber optic cable.

12. The method of claim 1 wherein said communications system provides video communications.

13. The method of claim 1 wherein said step of determining said probability that service will be blocked at said given time is performed through a network controller.

14. The method of claim 1 wherein said step of compressing communications on said at least one predetermined channel is performed through a compression coder.

15. The method of claim 1 wherein said at least one predetermined channel is selected through a traffic classifier and a circuit selector.

16. The method of claim 1 further comprising the step of increasing the compression of speech on a given channel when the system blocks a call on said given channel.

17. The method of claim 1 further comprising the step of decreasing the compression of speech on a given channel when said probability that service will be blocked is less than a given minimum blocking probability.

18. A communications system providing a given number of available voice and video channels in a given service area, comprising:
   a network controller for determining a number of available channels in the service area at any given time and for determining a probability that service will be blocked on the communications in said service area at said given time;
   a traffic classifier for determining a set of desirable compressible channels, which carry a compressible communication at an acceptable level of compression, and blocking compression of channels where distortion caused by compression is unacceptable;
   a compressor for compressing a given number of said desirable compressible channels when said probability that service will be blocked is greater than a predetermined maximum acceptable probability, said network controller selecting said given number of desirable compressible channels such that said network controller dynamically controls the performance of said communications system.

19. The communications system of claim 18 wherein said network controller directs said compressor to compress the communications on each channel of said communications system in said given service area.

20. The communications system of claim 19 wherein said network controller is operable to monitor said channels after said at least one channels is compressed to determine a new number of available channels and a new probability that service will be blocked, and wherein said compressor is operable to increase said compression on said at least one predetermined channel if said new probability that service will be blocked is greater than said maximum acceptable blocking probability.

21. The communications system of claim 18 further comprising:

a connection unit for requesting the compression of communications on any given channel, identifying each channel on which said communications was compressed, and combining two of said identified compressed channels to further increase capacity of said communications system in said given service area.

22. The communications system of claim 18 wherein said system provides voice and video communications.

23. The communications system of claim 22 wherein said communications system is a wireless system.

24. The communications system of claim 23 wherein said wireless system is a system selected from the group comprising time division multiple access (TDMA) systems, frequency division multiple access (FDMA) systems, and code division multiple access (CDMA) systems.

25. The communications system of claim 24 wherein said communications is performed through a digital facility.

26. The communications system of claim 25 wherein said digital facility utilizes a point-to-point microwave link.

27. The communications system of claim 25 wherein said digital facility utilizes a satellite link.

28. The communications system of claim 25 wherein said digital facility utilizes a fiber optic cable.

29. The communications system of claim 18 further comprising a traffic classifier and a circuit selector for selecting said at least one predetermined channel for compression.

30. The communications system of claim 18 wherein said network controller is operable to de-compress communications on a given channel when said probability that service will be blocked is less than a predetermined critical level.

31. The communications system of claim 1 wherein said steps a–c are initiated in response to a system outage.

32. A method of monitoring traffic channels in a communications system for reduction of a blocking probability of traffic channels as traffic increases, comprising the steps of:

monitoring a plurality of channels in the system for determining a blocking probability;

comparing the blocking probability with an acceptable reference blocking probability;

adjusting distribution of system signal capacities to achieve an acceptable blocking probability;

adjusting signal distribution by voice/data compression techniques and by improving channel quality; and identifying instances where the compression techniques cause unacceptable distortion and permitting such instances to operate uncompressed.

33. The method of claim 32, comprising the step of: identifying includes assigning a compressibility rating to each channel.

* * * * *